May 2, 1967 M. W. PATTERSON 3,317,006
FOLDING WHEEL CHOCK
Filed Dec. 23, 1965
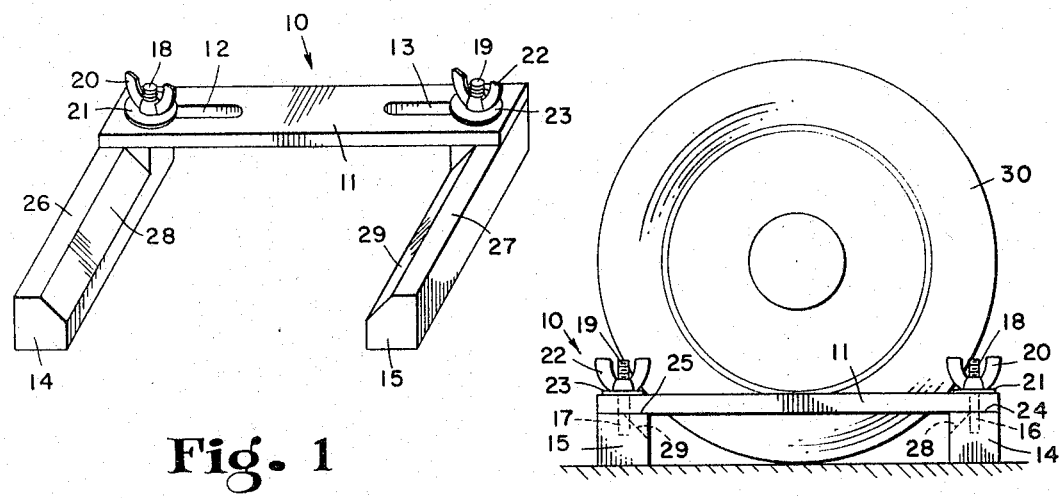
Fig. 1
Fig. 2
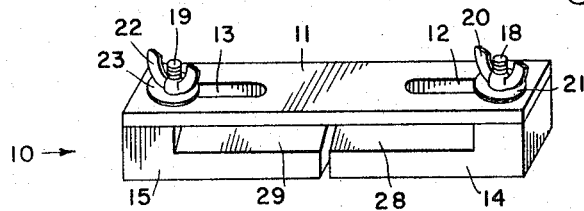
Fig. 3
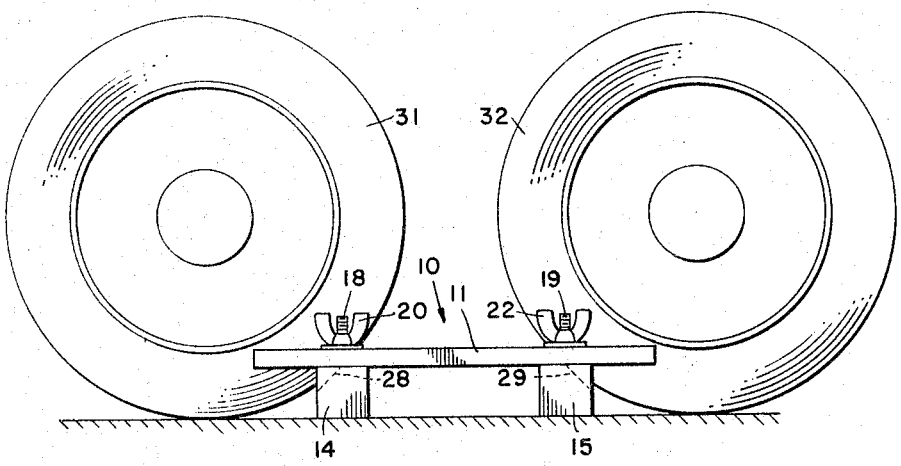
Fig. 4
INVENTOR
Maurice W. Patterson
BY
Hood, Gust & Irish
Attorneys

United States Patent Office 3,317,006
Patented May 2, 1967

---

3,317,006
FOLDING WHEEL CHOCK
Maurice W. Patterson, 3841 E. Stop 8 Road,
Indianapolis, Ind. 46227
Filed Dec. 23, 1965, Ser. No. 516,068
2 Claims. (Cl. 188—32)

The present invention relates to a folding wheel chock primarily intended for blocking a wheeled vehicle against accidental movement. The device of the present invention is primarily useful when a trailer of any type is to be parked for a considerable period, as in the case of house trailers, campers and the like; but as the description proceeds it will become obvious that the device may be used, as well, under many other circumstances and in connection with other types of vehicles. For instance, it is always desirable to provide blocking means, in addition to conventional brakes, to guard against accidental movement of a vehicle of any kind when one wheel is to be jacked off the ground.

The primary object of the invention, then, is to provide a simple, inexpensive, light chocking device which may be folded to occupy minimum space for storage and/or transportation, but which, when opened to use condition, will be effective thus to block a wheeled vehicle against accidental movement.

A further object of the invention is to provide a device of the character described which shall be adjustable for cooperation with wheels of different diameters, within a predetermined range.

Still another object of the invention is to provide such a device which may alternatively be used in cooperation with a single wheel of a vehicle or in cooperation with two wheels of a tandem assembly.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is a perspective view of a vehicle wheel chock, constructed in accordance with the present invention, in open, use condition for association with a single wheel of a vehicle;

FIG. 2 is a side elevation of the same device, looking in the opposite direction, and showing the device associated with a vehicle wheel and ready for adjustment into blocking relation thereto;

FIG. 3 is a perspective view of the same device, shown in its folded condition and looking in the same direction as FIG. 2; and FIG. 4 is a view similar to FIG. 2 but showing the device in blocking relation between two wheels of a tandem assembly.

Referring more particularly to the drawings, it will be seen that I have indicated my chock generally by the reference numeral 10. A spanner 11 which may be formed of wood, metal or even a block of relatively strong synthetic material, is formed with longitudinally extending slot means 12 and 13. In the illustrated embodiment of the invention, such slot means comprises separate, aligned slots arranged adjacent the opposite ends of the spanner 11, and I presently consider this construction to be optimum. However, it will be apparent that such slot means could be continuous from a point near one end of the spanner to a point near the opposite end thereof, provided the resultant reduction in over-all strength of the spanner can be tolerated.

Two arms 14 and 15, of opposite hand, are associated with the spanner 11. Each such arm is provided, adjacent one end, with upstanding shank means 16 or 17, each such shank means extending significantly above the upper surface of its associated arm. The upwardly extending portion 18 of the shank 16 is proportioned and designed to be movably received in the slot 12 and to project significantly above the upper surface of the spanner 11; while the corresponding portion 19 of the shank 17 is similarly related to the slot 13. The shank portions 18 and 19, in the illustrated embodiment of the invention, are threaded to receive wing nuts 20 and 22, each having an enlarged, flattened base portion 21 or 23 proportioned and designed to span the associated slot and frictionally to engage the upper surface of the spanner 11.

Thus, the arms 14 and 15 are operatively connected with the opposite end portions of the spanner 11, in allochiral relationship, for independent adjustment about the axes of the respective shanks 16 and 17 and for relative movement toward and away from each other in the direction of extension of the slots 12 and 13; but, by tightening the nuts 20 and 22, said arms may be fixedly secured in any desired relationship to said spanner 11.

The upper surface of the arm 14 is formed to provide a flat area 24 at that end which carries the shank 16, the longitudinal extent of the area 24 preferably being substantially equal to the transverse width of the spanner 11, and said area 24 is arranged in bearing contact with the lower surface of said spanner, the shank 16 being substantially centered in said area. The corresponding end of the upper surface of the arm 15 is provided with a similar flat area 25, in which the shank 17 is substantially centered, said area 25 similarly bearing upon the lower surface of the spanner 11. Preferably, but not necessarily, the remainder of the length of each arm is bevelled to define a face 28 or 29 which intersects the surface 26 or 27 at an obtuse angle which I presently believe should preferably be about 135°.

It will be apparent that, when the chock disclosed herein is to be stored or transported, it may be folded to the condition of FIG. 3 in which arms 14 and 15 directly underlies the spanner 11, it being understood that each of said arms has a length slightly less than one-half the length of the spanner 11 so that, when the shanks 16 and 17 are positioned at the remote ends of the slots 12 and 13, the arms may be turned to the positions illustrated in FIG. 3 without interference.

When the device is to be used with a single wheel such as that suggested at 30 in FIG. 2, the wing nuts 20 and 22 will be loosened and the arms 14 and 15 will be turned in a direction away from the viewer as seen in FIG. 3, through 90°. Then, with the chock substantially in the condition illustrated in FIG. 1, and with the distal ends of the arms 14 and 15 pointed toward the median longitudinal plane of the vehicle, the chock will be moved toward that plane with one of the arms immediately forward of the vehicle wheel and the other arm disposed rearwardly of the same wheel. As is clearly shown in FIG. 2, the chock is so proportioned and designed that, when the shanks 16 and 17 are at the remote ends of the slots 12 and 13 and the arms are arranged as in FIG. 1, the space between the arms will exceed the length of a chord of the wheel located at the level of the spanner 11. Now, the arms will be moved toward each other until each engages the adjacent surface of the tire, whereupon the wing nuts 20 and 22 will be tightened to secure the arms against movement relative to the spanner.

Obviously, the chock of the present invention may be made in a range of sizes for cooperation with vehicle tires of various sizes, though it will be apparent that the adjustability built into the chock is sufficient so that, for instance, one size of chock will be adapted for use with the wheels of any standard or medium sized passenger automobile, while another size may be necessary for use with the wheels of foreign compacts or miniature automobiles and still another size for cooperation with truck wheels.

In FIG. 4, I have shown the same chock assembly rearranged for cooperation with the front and rear tires 31 and 32 of a tandem assembly. For this purpose, the arms 14 and 15 have been turned in the opposite direction relative to the spanner 11 so that the bevelled surfaces 28 and 29 face away from each other. With the shanks 16 and 17 arranged at the adjacent ends of the slots 12 and 13, the distance between the faces 28 and 29 will be less than the distance between the tires 31 and 32, at the level of said faces, and the chock assembly will be thrust, in the same way, between those two tires. Then, the arms 14 and 15 will be moved away from each other until the faces 28 and 29 come into contact with the tires 31 and 32, whereafter the wing nuts 20 and 22 will be tightened as before. It will be apparent that this arrangement may be used, if desired, even when the tires 31 and 32 are so large as to prevent association of the chock with either of them in the relationship illustrated in FIG. 2.

In the illustrated embodiment of the invention, I have shown the shanks 16 and 17 anchored at their lower ends within the bodies of the arms 14 and 15. It will be apparent that, alternatively, the elements 16 and 17 could be headed bolts completely penetrating the arms and with their heads countersunk into the lower surfaces of the arms 14 and 15.

I claim as my invention:
1. A vehicle wheel chock comprising
a spanner formed with longitudinally-extending slot means therethrough,
a pair of blocker arms,
upstanding shank means carried by each of said arms adjacent one end thereof,
said shank means being movably receivable in said slot means to extend above the upper surface of said spanner,
and fastening means operatively engageable with the upwardly-extending portions of said shank means and clampingly engageable with said spanner selectively to secure said arms in adjusted positions relative to said spanner, the upper surface of each arm including a flat area at said one end defining the maximum height of said arm and having a longitudinal dimension substantially equal to the width of said spanner, said shank means being substantially centered in said area, the combined length of said arms measured from said shank means to the distal ends of said arms being less than the distance between the remote ends of said slot means to permit pivotal folding of said arms under said spanner.

2. The vehicle wheel chock of claim 1 in which each of said shank means is fixedly secured to its arm, the upper end of each shank means is threaded, and said fastening means comprises a wing nut for each shank means, each wing nut having a flat base for engagement with the upper surface of said spanner.

References Cited by the Examiner
UNITED STATES PATENTS

| | | | |
|---|---|---|---|
| 2,011,469 | 8/1935 | Brueggmann | 188—32 |
| 2,450,539 | 10/1948 | Brock | 188—32 |
| 2,491,989 | 12/1949 | Lind | 188—32 |
| 2,517,673 | 8/1950 | Johnson | 188—32 |

FOREIGN PATENTS 529,235  11/1921  France.

MILTON BUCHLER, *Primary Examiner.*
BENJAMIN HERSH, *Examiner.*
B. S. MOWRY, T. W. BUCKMAN, *Assistant Examiners.*